United States Patent [19]

Nash

[11] Patent Number: 5,649,601
[45] Date of Patent: Jul. 22, 1997

[54] PLOW ASSEMBLY WITH FLOATING WING SWEEP

[76] Inventor: Willis O. Nash, 356 Crepe Myrtle Dr., Ocilla, Ga. 31774-3300

[21] Appl. No.: 600,879

[22] Filed: Feb. 13, 1996

[51] Int. Cl.$^6$ .................................................. A01B 39/20
[52] U.S. Cl. .......................... 172/194; 172/196; 172/722; 172/742
[58] Field of Search .................... 111/120, 123, 111/124, 149, 152, 156, 147, 924; 172/139, 140, 144–146, 149, 193, 194, 195, 196, 264–266, 722, 742, 744

[56] References Cited

U.S. PATENT DOCUMENTS

| | | | |
|---|---|---|---|
| 641,595 | 1/1900 | Hunt . | |
| 780,405 | 1/1905 | Boyle . | |
| 1,303,813 | 5/1919 | Brabandt . | |
| 2,333,371 | 11/1943 | Graham | 97/207 |
| 2,469,044 | 5/1949 | Lane | 172/194 |
| 2,595,351 | 5/1952 | Graham | 97/207 |
| 2,597,608 | 5/1952 | Altgelt et al. | 97/78 |
| 2,604,025 | 7/1952 | Raven | 172/194 X |
| 2,894,590 | 7/1959 | Johnson | 172/194 |
| 3,007,533 | 11/1961 | Hill | 172/730 |
| 3,055,128 | 9/1962 | Edwards | 37/142 |
| 3,393,753 | 7/1968 | Perkins | 172/700 |
| 3,556,227 | 1/1971 | Homdrom | 172/193 |
| 3,770,066 | 11/1973 | Young | 172/194 |
| 3,923,104 | 12/1975 | Tibbs | 172/730 |
| 4,047,577 | 9/1977 | Tibbs, II | 172/730 |
| 4,457,381 | 7/1984 | Wetmore | 172/722 |
| 4,585,074 | 4/1986 | Fleischer et al. | 172/194 |
| 4,645,013 | 2/1987 | Edmisson | 172/730 |
| 5,398,770 | 3/1995 | Harden | 172/196 X |
| 5,409,068 | 4/1995 | Hake et al. | 172/196 |

*Primary Examiner*—Terry Lee Melius
*Assistant Examiner*—Robert Pezzuto
*Attorney, Agent, or Firm*—Isaf, Vaughan & Kerr

[57] ABSTRACT

A plow assembly is provided with a row of colters which cut the stalks when the plow is towed by a tractor over a prescribed area of ground. The plow has additional parallel tool bars which carry staggered plow times or shanks which carry plow shares, the plow shares protruding forwardly so as to cut parallel furrows along the ground. The shanks receive brackets, each of which includes a central tongue straddled by forwardly protruding arms of a bracket which is mounted on the central portion of a V-shaped flat sweep. A bolt or pivot pin passing through the bracket arms and the tongue permit each sweep to pivot about 180° about a horizontal axis of the pivot pin.

7 Claims, 2 Drawing Sheets

PLOW ASSEMBLY WITH FLOATING WING SWEEP

FIELD OF INVENTION

This invention relates to agricultural plows and is more particularly concerned with a plow assembly having floating wing sweeps.

BACKGROUND OF THE INVENTION

In the past, plow assemblies have been devised for shallow tilling using a sweep which is towed by a plow assembly. Some of these sweeps are employed to sweep along the surface of the ground, as the plow penetrates into and plows the ground, for clearing the furrow of loose soil, weeds and stalk roots. For example, in U.S. Pat. No. 3,393,753, a sweep is taught, which moves the subsoil laterally to both sides of a vertical cut made by the plow. U.S. Pat. No. 3,770,066 discloses a V-shaped tool which is hinged about a horizontal axis and is pivotally connected to the rear of a scoop for clearing the furrows of loose soil between the rows of crops and pushes the dirt laterally to cover small weeds. U.S. Pat. No. 2,597,608 discloses a subsoil sweep for slicing the subsoil so as to afford better water penetration. U.S. Pat. No. 3,556,227 discloses soil conditioning devices which are V-shaped and are towed by swively mounted rods disposed behind by conventional plows. U.S. Pat. No. 4,585,074 discloses earth working blades which pivot about a vertical axis rearward of one of the earth working blades. U.S. Pat. Nos. 780,405 and 641,595 disclose plows provided with adjustable wings extending from the plow shovel for shallow cultivation. U.S. Pat. No. 1,303,813 reveals a plow in which wings pivoted about a vertical axis rearward of the point of the plow beam so that these wings engage the thrown up earth.

None of these prior art devices, however, appear to be suitable for plowing shallow furrows wherein the lateral subsoil between the furrows is cut beneath the surface to provide shallow tillage across the width of the plow assembly with a minimum of force applied to the plow.

SUMMARY OF THE INVENTION

Briefly described, the present invention includes a plow assembly formed from a conventional main frame, having a plurality of spaced, parallel, transversely extending, tow or tool bars, connected by longitudinally extending cross bars. A conventional three point hitch is centrally connected in a convention manner to the front tool bar so that the main frame can be disposed in a horizontal plane and towed over the ground by a tractor. A plurality of equally spaced clamps are mounted on the front tool bar and respectively receive upright staffs having spring loaded colters (coulters) mounted thereon. The function of the colters is to cut stalks and the Found in advance of the plowshares.

The next two rows of tow or tool bars carry additional clamps which respectively support the staggered, arcuate, chisel plow tines. The lower end portions of each arcuate tine contains a chisel plow share which, in turn, tows a floating wing sweep, pivotally mounted at its forward central portion to the plow shank. Each sweep is a flat, substantially V-shaped member having opposed, rearwardly diverging wings. When plowing, the path of travel of the rear wings overlap the path of travel forward wings. The pivotable mounting of the sweeps to their plow shanks enables the sweeps to pivot freely about horizontal, transverse axes so as to track and remain essentially level and submerged below the surface of the land being tilled, to the depth of the chisel point of its tine.

Accordingly, it is an object of the present invention to provide a plow assembly which will effectively plow the soil and, with one pass across the area, till a width, corresponding generally to the width of the plow assembly.

Another object of the invention is to provide floating sweeps for a plow assembly which will simultaneously destroy the subsoil stalk roots and soften the top soil, while the plow elements plow and turn the soil with one sweep of the plow.

Another object of the present invention is to provide a plow assembly capable of plowing a large sub-surface area with a single sweep and with a minimum of additional power being required from the tractor to propel the plow assembly along its prescribed path.

Another object of the present invention is to provide, in a plow assembly, a readily removable, laterally extending, subsoil sweep which remains essentially level during operation and reduces to a minimum of any additional power required to tow such a sweep.

Another object of the present invention is to provide an apparatus for plowing, which is inexpensive to manufacture, durable in structure and efficient in operation.

Another object of the present invention is to provide a plow assembly which will readily till, in a single pass along the ground, a cross section of soil which normally requires two or more passes of a conventional plow.

Another object of the present invention is to provide a plow assembly which will cut essentially all of the stalks and the roots of the stalks, in its path of travel, in one pass and leave the soil ready for the next crop.

Another object of the present invention is to provide a plow assembly which uniformly shallow tills a wide area of soil over which the plow assembly passes, without the need for shifting the plow at the end of each row.

Another object of the present invention is to provide a plow assembly which, when used for tilling, will reduce the likelihood of nematode build up in the soil.

Another object of the present invention is to provide a plow assembly which will effectively till equally well, soils which have grown various types of crops.

Another object of the present invention is to provide a plow assembly and process which will eliminate most of the problems of furrow collapse, which is usually caused by heavy rains shortly after planting.

Another object of the present invention is to provide a plow assembly and process of plowing which will provide wide, shallow and soft strips of primarily top soil in which the top soil is only minimally disturbed, so that when planted, the soil will permit the crops to develop a better root systems, particularly in dry weather.

Another object of the present invention is to provide a floating wing for a chisel-type plow which is inexpensively manufactured and easily attached to existing chisel plows and which, when used, will till equally well for many crops and can be used in place of a heavy harrow.

Another object of the present invention is to provide a plow assembly in which the depth of penetration of the wings attached to the plow shanks will be controlled so as to maintain a uniform level of tilling during the operation of the plow assembly.

Another object of the present invention is to provide a readily detachable wing sweep for a chisel plow.

Another object of the present invention is to provide a wing sweep for a chisel plow which has an extended useful life and is easily sharpened.

Another object of the present invention is to provide a wing sweep for a chisel plow wherein the wing sweep can be selectively positioned for various prescribed depths of operation of the sweep.

Other objects, features and advantages of the present invention will become apparent from the following description when considered in conjunction with the accompanying drawings.

DETAILED DESCRIPTION

Figure 1:
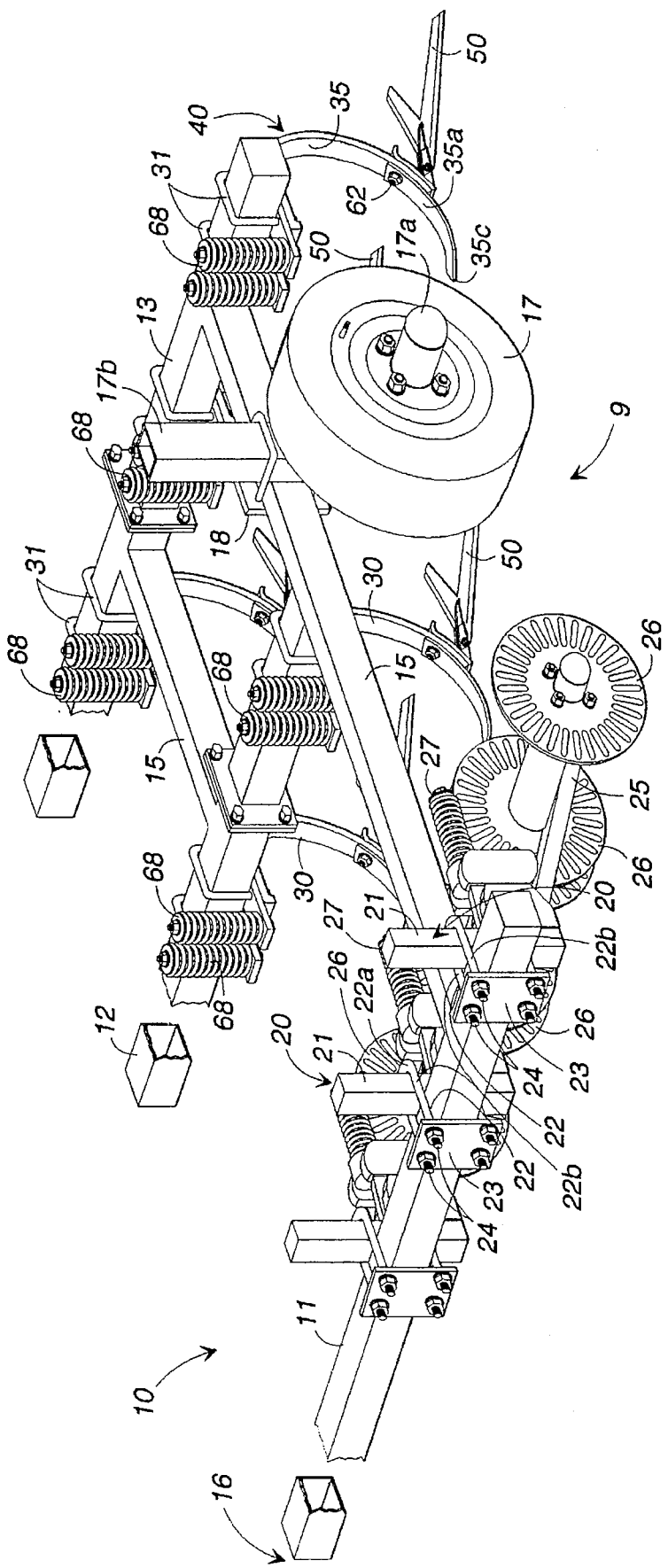
FIG. 1 is a fragmentary perspective view of a portion of a plow assembly, constructed in accordance with the present invention.

Referring now in greater detail to the drawings in which like numerals indicate like parts throughout the several views, FIG. 1 illustrates the plow assembly 9 of the present invention, numeral 10 denoting, generally, the main frame of the plow assembly. Frame 10 is has a substantially conventional construction, including a first or front tool bar 11, a second or central tool bar 12 and a third or rear tool bar 13. These tool bars 11, 12 and 13 extend transversely, in parallel relationship to each other and are equally spaced longitudinally from each other. Spaced longitudinally extending cross bars 15 are mounted to and join the tool bars 11, 12 and 13 together to form the rigid main frame 10. Each of the tool bars 11, 12, and 13 and cross bars 15 are generally square or rectangular in cross-section and are aligned in a common plane.

The frame 10 has a conventional three point hitch, denoted, generally, by numeral 16. Hitch 16 is secured to the front central portion of front tool bar 11 and includes a pair of transversely opposed side hitches and an upstanding central hitch. These side hitches and the central hitch are removably connected, in a conventional manner, to hydraulic lift arms and a hitch bar of a tractor (not shown) so that the tractor can tow the frame 10 in a horizontal raised position, a lowered position or an inclined position.

The plow assembly has a pair of transversely opposed transportation wheels, such as wheel 17, at the opposite sides of the frame 10. These wheels 17 are rotatably carried by individual axles 17a, mounted on upright stantions, such as stantion 17b, which, themselves are clamped sidewise to the outermost cross bars 15 by clamps 18. The longitudinal positions of the wheels 17 can be adjusted by loosening and sliding the clamps 18 along the cross bars 15. Upon loosening of clamps 18, the height of the wheels 17 with respect to the frame 19 also is adjustable and/or the wheel assemblies can be removed, if necessary. Typically, when the plow of the present invention is towed along a field by a tractor, it is preferable to remove the transportation wheels 17, together with their axles and stantions 17a and 17b, respectively. In addition, the clamps 18 generally are removed with the removal of both wheels.

A series of transversely aligned, colter (coulter) assemblies, denoted by numeral 20, are mounted along the front tool bar 11, with the colter assemblies spaced about 12 inches (30.48 cm.) apart. Each colter assembly 20 includes a straight, rigid, generally upright, staff 21. The upper ends of the upright staffs are clamped, in upright positions, onto one side of the from tool bar 11 by upper, substantially U-shaped yokes 22. The bends or arcuate portions 22a of the upper yokes pass around vertically spaced increments of the upright staffs 21, while the legs 22b of each yoke 22 pass through appropriate holes in a clamping plate 23, the end portions of the legs being externally threaded for threadedly receiving nuts 24, thereon.

At the lower end of each staff 21 is a swivel yoke 25 that extends rearwardly and includes a pair of rearwardly extending arms 25a. The arms of the swivel yokes 25 support colters 26, which are yieldably urged toward the ground by springs 27 mounted on and extending along the yoke arms 25a. Each colter 26 is a disc shaped wheel, having a sharp peripheral blade or edge, with side serrations typically formed adjacent the peripheral edge. The colters are towed along the ground and engage and cut up crop stalks lying on the ground prior to the tilling of the ground.

Figure 2:
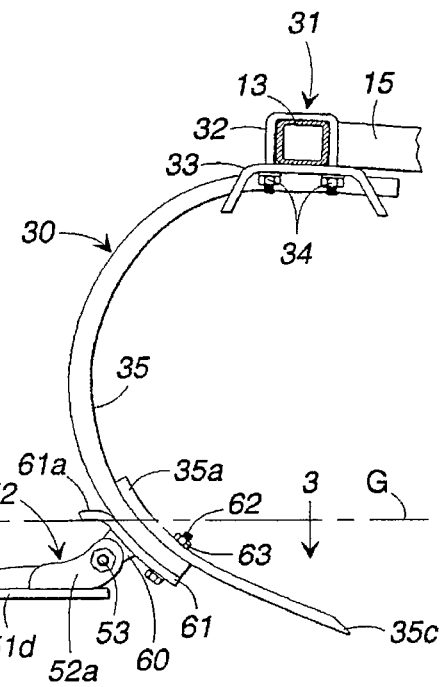
FIG. 2 is an enlarged fragmentary side elevational view of a portion of the plow assembly shown in FIG. 1 and showing the chisel plow with the sweep of the present invention attached.

The second or central tool bar 12 and the third or rear tool bar 13, each carry a plurality of juxtaposed, equally spaced plow elements, generally denoted by numerals 30 and 40 on the respective tool bars 12 and 13. As best seen in FIG. 2, each plow element 30 or 40 includes a clamp 31 that mounts and secures the plow elements to the tool bar. Each claim typically includes a pair of spaced, downwardly opening U-shaped bolts or yokes 32, the bights 32a of which engage and pass around the top portion of the tool bar, and which have a pair of downwardly depending arms 32b that extend adjacent the opposed side portions of the tool bar 12 or 13. Retaining plates 33 are received against the bottom side of the bar 12 or 13, with the arms of the yokes passing therethrough. Nuts 34 are received and tightened on the ends of arms of the yokes 32 to attach the retaining plates thereto. The retaining plates 33 respectively support the upper, proximal end portions of shanks or tines 35 of plow elements 30 or 40.

As shown in FIG. 2, the shanks or tines 35 of the plow elements 30 and 40 are each arcuate, substantially C-shaped, forwardly opening members formed from a metal, such as steel, each carrying at its distal end portion a forwardly pointed chisel plow share 35a. The tines 35 of the plow elements 30, on the second or central tool bar 12, are generally transversely aligned and are evenly spaced and curve about a first common transverse axis lying above the ground and below the plane of the tool bars 11, 12 and 13. In like fashion, the third or rear tool bar 13 is provided with plow elements 40 having tines 35, similar or identical to those of the plow elements 30. These tines or shanks 35 of plow elements 40 are staggered with respect to the other tines or shanks 35 of plow elements 40 and curve about a second transverse axis lying above the ground and below the plane of the tool bars. The first and second transverse axes of the plow elements 30 and 40 are parallel to each other and lie in a common plane between and parallel to the plane of tow bars 11, 12 and 13 and the ground.

The lower or distal ends of the tines or shanks 35 of the plow elements carry plow shares 35a which have diverging front edges sharpened to a point 35c. The plow shares 35a of plow elements 30 and 40 tend to cut equally spaced, shallow, parallel furrows, each throwing the dirt equally on both sides. The plow shares 35a of the plow elements 30 and 40, being staggered, further enable their plow points 35c to cut evenly spaced shallow furrows in the ground immediately after the stalks on the ground have been cut by the colters 26.

According to the present invention, each shank 35 of plow elements 30 and 40 is provided with a pivotable mounted floating wing sweep, denoted generally by numeral 50. Each sweep 50 is a flat, V-shaped blade 51 having a central body 51a at its vertex and having transversely opposed, rearwardly diverging wings 51b and 51c extending therefrom. The wings are provided with front cutting edges 51d and 51e which are sharpened for cutting into the roots in the sub-soft below ground level. The rear or inner edges 51f of the wings 51b and 51c extend inwardly and respectively parallel to the outer cutting edges 51d and 51e, thus, defining an acute angle γ of between about 40° to about 100°.

Each sweep 50 has a hinge assembly by which it is connected at its forward apex to the shank or tine 35. The hinge assembly includes an upstanding, forwardly opening, U-shaped or bifurcated hinge strap or bracket 52, having opposed arms 52a. The arms 52 each have transversely aligned holes through which a transverse pivot pin or bolt 53 protrudes, the bolt 53 having external threads at its distal end for receiving a nut 54 to secure it to the bracket 52. Each strap 52 is welded to the upper surface of its sweep body 51a and receives, between its arms 52a, a tongue 60 having a hole (not shown) through which the bolt 53 protrudes. The forward end of the tongue 60, is welded to an arcuate convex mounting plate 61 which, in turn, is received flat against the rear concaved surface of the distal end portion of shank or tine 35. As shown in FIG. 2, the tongue 60 and bolt 53 hold the sweep 50 in a position parallel to and below the bolt 53 so that the wings 51b and 51c remain transversely parallel to each other and usually parallel to all other sweeps 50.

Figure 3:
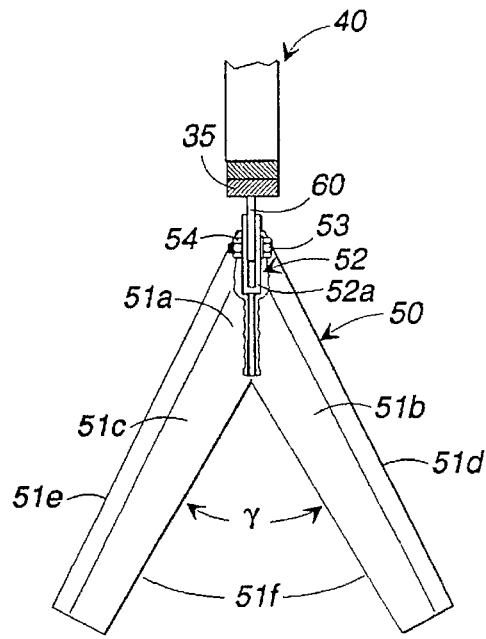
FIG. 3 is a plan view of the floating wing sweep of the plow assembly shown in FIG. 1.

A bolt 62 (FIG. 3), passes through plate 61 and the distal end portion of each shank 35 and the upper central portion of plow share 35a and receives a nut 63 for securing plate 61, shank 35 and plow share 35a, together. The height of each sweep 50 can be raised or lowered by relocating the single bolt 62. It is desirable, however, to have the sweep at the same depth as the plow point 35c. The upper end portion of plate 61 is bent rearwardly to provide a rearwardly and downwardly protruding ledge 61a which extends over and above the tongue 60 and functions as a stop for launching the swing of the blade 50 in an upward direction. This ledge 61a may be eliminated, if desired.

Each sweep 50 will pivot through an arcuate movement of about 180° when the plow assembly axis of the bolt or pivot pin 53 is above and near the forward apex of sweep 50. Therefore, as the plow shares 35a are urged into the ground, the sweep 50 tends to pivot to a forwardly inclined position, tending to track the path of chisel point 35c. The dirt thrown sidewise by plow share 35a tends to guide the sweep 50 into a submerged position, whence, with further movement of the tine 35, the sweep 50 is positioned in a horizontal submerged, shallow position for plowing the subsoil.

As seen in FIG. 1, the proximal end portion of the tine or shank 35 of each plow element 30 further is urged upwardly by a spring 68 so that each plow element 30 is spring loaded in a forward direction and will yield rearwardly under spring tension, should the plow share 35a strike a large rock or some other obstruction.

In use of the plow assembly 9 (FIG. 1), the plow assembly is lowered to a level position behind a tractor with the plow share points protruding into the ground and so that the colters 26 are spring loaded to the extent that they will engage and cut the stalks lying on the ground. The frame 10 is then towed in its horizontal position whereupon the plow shares 35a dig into the ground, each towing behind it, its attached sweep 50. Since each sweep 50 is pivoted about a transverse axis defined by the bolt or pivot pin 53 (seen in FIG. 2), the sweeps 50 initially will be inclined to dig into the ground and then swing to a horizontal position aligned with the sharpened end of the plow share 35a, substantially as shown in FIG. 2. Thus, each sweep 50 is beneath the level of the ground g and trails behind its plow share 35a.

Figure 4:
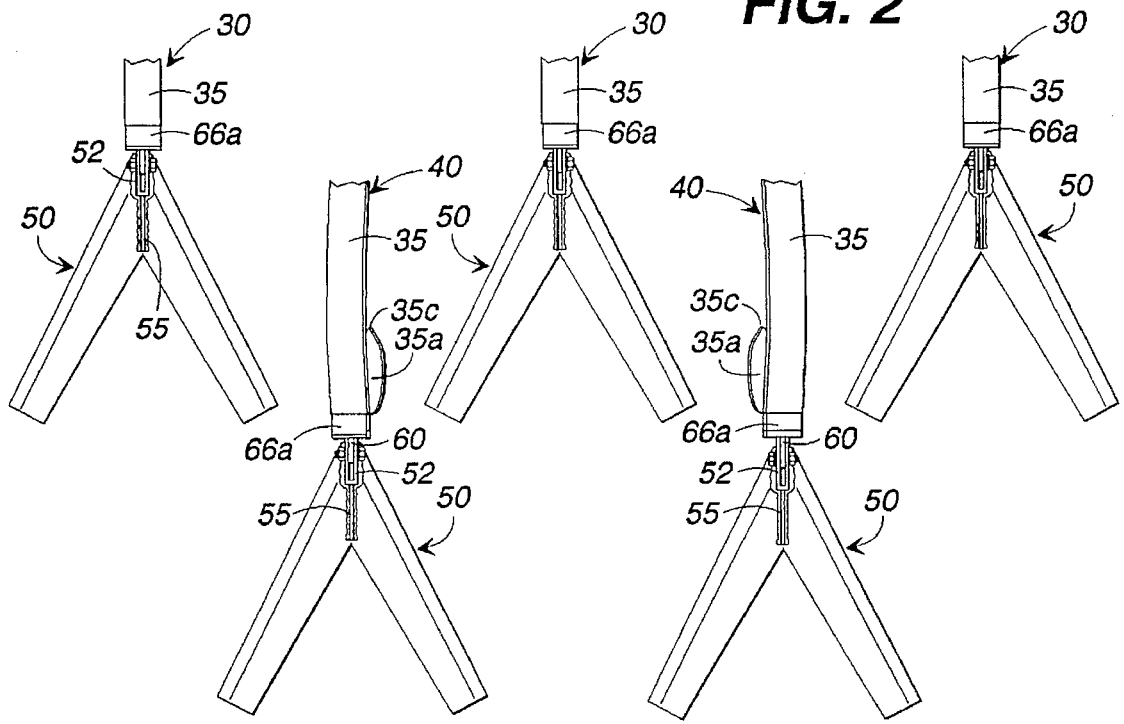
FIG. 4 is schematic view of the floating wing sweep shown in FIGS. 1, 2 and 3, attached to a series of chisel plows for overlapping tilling.

As seen in FIG. 4, the plows 30 and 40 being staggered in two transversely aligned rows, permits the front sweeps 50, which are connected to the plow elements 30 to create horizontal cuts immediately below the level of the ground g. Since the sweeps 50, which are connected to the plow elements 40 overlap the sweeps 50 connected to the plow elements 30, are in a common horizontal plane, after the plow begins its plowing operation, the entire area behind the plow will be cultivated, with the sweeps cutting any roots which remain in the ground. Since the sweeps essentially track the plow shares 35a, protruding laterally beyond the plow shares 35a, the cultivation, while being uniform and close to the top of the soil, requires very little energy or force to be applied by the tractor, whereas other types of plows which tend to cultivate the sub-soil, also tend to require substantially more force or horsepower to move the prior art plow along the ground.

The depth at which the sweeps 50 will travel depends upon the position of the tongue 60, and with the relocation of the bolt 62, the depth at which the sweep 50 operates can be altered quite readily. The sweeps 50 each are attached by a single transverse bolt 53 to the tongue 60, and therefore by removing this transverse bolt 53, each sweep 50 readily can be removed from the shank or tine 35 so that the edges 51c and 51d can be sharpened without dismembering the remainder of the plow assembly.

When the plow assembly 10 is raised into a transportation position, the sweeps 50 tend to hang pendant in essentially a vertical position from the shanks 35, as the floating wing sweeps 50 can pivot about 180° about the pivot pin or transverse bolt 53. This vertical pivoting movement enables the sweeps to run through the soil in a level position at substantially all times. This constant level position of the sweeps thus requires considerably less horsepower than a fixed wing sweep. Additionally, the floating wing sweep 50 can be made of heavy metal such as ⅜ inch to ½ inch thick steel and will last up to six times longer than a fixed wing sweep. Also, since the mounting bracket 60 and the bolt 53 are on the rear side of the plow shank 35, there is almost no wear on these parts. This allows the chisel plow to be operated as a conventional chisel plow when only one bolt is removed per shank 35. With multiple holes in the mounting bracket, the floating wing sweep 50 can be operated at various depth levels in relation to the chisel plow point 35c. This feature is especially useful in some jobs such as plowing up cotton fields. The colters 26, which are mounted on the front tool bar 11 further reduce the tillage required to destroy cotton shanks and prepare the land for a new crop for a savings of about 30% to 50% in the costs of tilling and preparing a field for planting.

In general, only one pass of the plow 10 over the area to be cultivated is required. The design of the floating wing attachment of the present invention enables plowing of 100% of the stalks in one pass and leave the soil ready for the next crop. It requires no shifting for operating in an opposite direction in plowing the fields. The wing sweeps further enable significant, early destruction of stalk roots, which helps reduce a nematode buildup and hence the plow of the present invention is particularly useful in minimizing the nematode problem. The floating wing attachment 50 also can be mounted on a planter ripper foot and in such an arrangement will leave a much wider, soft strip, to provide give better root systems in dry weather, and reduce the problem of furrow collapse caused by heavy rains shortly after planting. The colters 26 used with this invention further should be heavy duty colters and should be spaced as pointed out above at about 12 inches apart. Thus, the plow 10 will work equally well in any crop and can be used in place of a heavy harrow.

It will be obvious to those skilled in the art that many variations may be made in the embodiment herein chosen for the purpose of illustrating the preferred embodiment of the present invention, without departing from the scope thereof, as defined by the appended claims.

I claim:

1. A plow assembly having a main frame for being moved over the ground in a longitudinal direction along a path of travel, a plurality of coulters connected to the frame and being moved by the frame for engaging the ground over which said frame is moved and for cutting vegetation on the ground over which the coulters pass, a plurality of transversely spaced individual plow elements connected to the frame rearwardly of the coulters, the plow elements having blades for penetrating the ground and creating spaced, parallel furrows in the ground when the frame is moved over the ground, the improvement therein comprising:

sweeps respectively mounted on and towed by the plow elements and pivotable with respect to the plow elements;

a hinge assembly for connecting each of said sweeps to said plow elements, said hinge assemblies being mounted respectively to a forward portion of each of said sweeps of pivoting respectively above the plane of said sweeps about horizontal axes so as to substantially automatically become aligned level with the plow elements as the sweeps are towed through the ground by the plow elements; and said sweeps positioned rearwardly of said plow elements and each including wings that extend in diverging directions rearwardly and outwardly from said plow elements for tilling sub-soil below the level of the ground and sidewise outwardly of the furrows created by the plow elements.

2. The plow assembly defined in claim 1 wherein said sweeps each comprise a substantially V-shaped member that is essentially flat, with said wings being provided with outer edges which form cutting edges for cutting roots below the surface of the ground.

3. The plow assembly defined in claim 1 wherein said hinge members each include a tongue extending rearwardly from the lower portion of each of said plow elements and a transverse pivot pin carried by said tongue above and at the forward portion of each of said sweeps for permitting said sweeps to respectively pivot about said horizontal axes.

4. The plow assembly defined in claim 1 wherein said plow elements are disposed in two transverse rows connected by their distal end portions to the frame, said plow elements each having a concave forwardly opening tine and a plow share protruding from a distal portion of said tine, said plow shares each having a blade for penetrating the ground, and with said sweeps being pivotally respectively mounted on rear portions of the distal portions of said tines.

5. A sweep for being connected to the plow element of a plow assembly for creating a lateral furrow as the plow element creates a central furrow in ground being tilled by the plow assembly, said plow element having a rear portion, comprising:

(a) a generally V-shaped flat blade defining a common plane, a body having a central apex area in said plane and a pair of diverging wings in said plane and extending from said apex area, said wings being providing with a pair of rearwardly diverging front cutting edges for engaging lateral portions of the ground as said blade is towed by said plow element;

(b) a hinge having a hinge portion which is secured to said apex area of said blade, said hinge portion extending at an inclined to said plane away from said blade; and (c) a pivot element on said hinge portion and by which said sweep is pivotally connected to the rear portion of said plow element, said pivot element permitting said sweep to freely pivot about a horizontal axis positioned above the plane of said sweep, approximately 180° with respect to said plow element to enable said sweep to automatically track and become aligned with said plow element and remain substantially level and submerged below the ground being tilled as the sweep is towed behind said plow element.

6. The sweep defied in claim 5 wherein said wings extend divergently between about 40° and about 180° with respect to each other.

7. The sweep defined in claim 5 wherein said wings have essentially parallel forward and rearward edges and said forward edge of each wing is sharpened for forming said cutting edges.

* * * * *